1,846,359

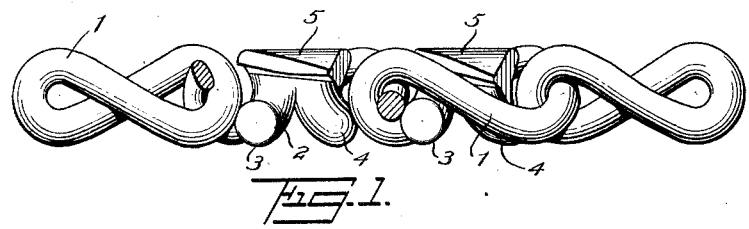
Fig. 1.
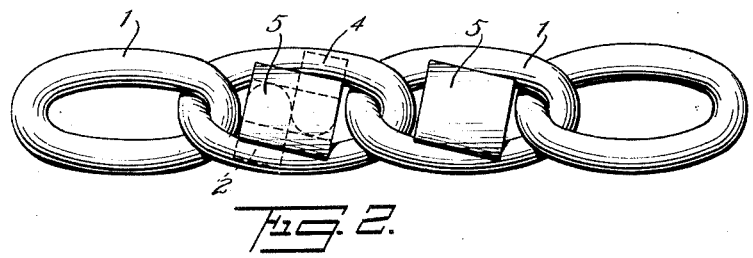
Fig. 2.
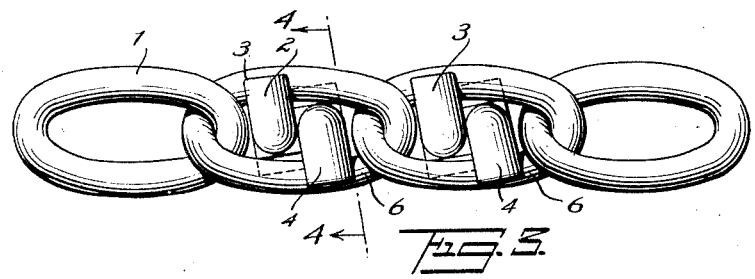
Fig. 3.
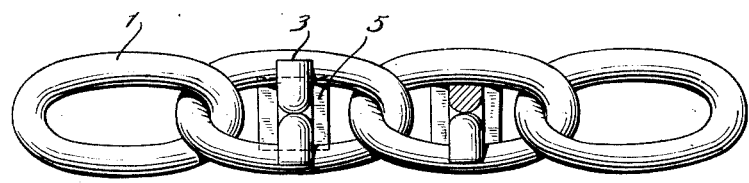
Fig. 6.
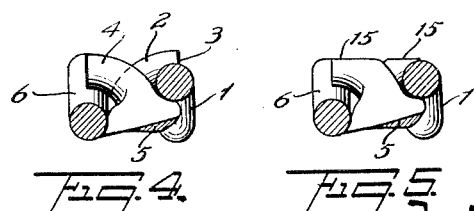
Fig. 4.   Fig. 5.
INVENTOR
John R. Reyburn
BY
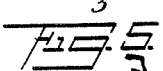 ATTORNEY Feb. 23, 1932.  J. R. REYBURN  1,846,359
TREAD STRUCTURE FOR ANTISKID DEVICES FOR VEHICLE WHEELS
Filed Oct. 5, 1925    2 Sheets-Sheet 2
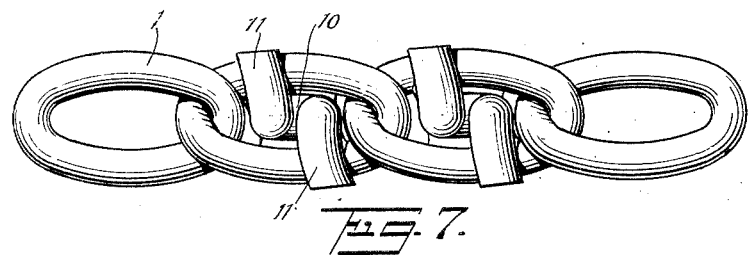
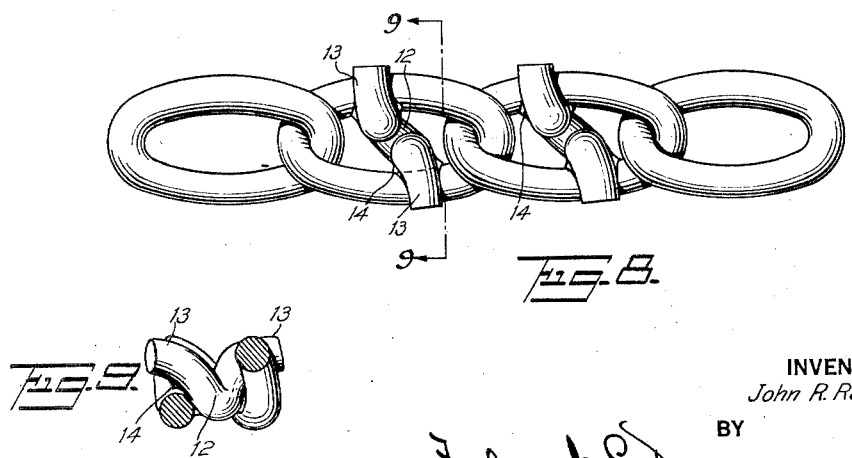
INVENTOR
John R. Reyburn
BY
Frederick P. Duncan, ATTORNEY Patented Feb. 23, 1932

UNITED STATES PATENT OFFICE

JOHN R. REYBURN, OF FAIRFIELD, CONNECTICUT, ASSIGNOR TO AMERICAN CHAIN COMPANY, INC., A CORPORATION OF NEW YORK

TREAD STRUCTURE FOR ANTISKID DEVICES FOR VEHICLE WHEELS

Application filed October 5, 1925. Serial No. 60,400.

This invention relates to tread structure for anti-skid devices for vehicle wheels and is shown for convenience of illustration embodied in a supporting structure comprising a conventional type of chain, each link of which is twisted on its longitudinal axis to such an extent that the two ends lie in planes at a considerable angle from each other, usually from 60° to 90°. This chain is commonly known as curb chain. The particular form of chain, however, it not an essential part of the invention and other forms may be used that will serve the purpose as well as the curb chain.

One of the objects of the present invention is to provide an additional contact area or additional contact over and above those supplied by the chain itself, which will not only share with the chain itself the wear incident to ordinary use, but will prevent sliding to a substantially greater degree than any of the previous devices known to me. The method employed in preventing sliding over smooth or slippery surfaces consists in the incorporation in the simple chain itself of an additional contact body of such characteristics, more particularly configuration, as to present an edge in the direction of the road surface which will effectively engage the minor irregularities above referred to and penetrate the smooth surfaces of paved or icy roads to an extent that will effectively promote traction.

At the same time, it is desirable that the retarding functions of the structure should not be exerted against the tire itself for the reason, in the first place, that it would cut and abrade the tire, and in the second place, because, regardless of the nature of the tire-contact surface of the tread, it is desirable that the latter be free to revolve at a very low rate of speed about the periphery of the tire in order to reduce wear on the latter.

Another feature which is desirable in conjunction with the edge-like conformation is that this edge-like conformation shall persist in spite of the wear at least until the chain structure has become so weakened as to render the tread as a whole useless; and it is another of the objects of the present invention to provide such a feature.

Another object of the invention is to provide an additional contact body that will be cheap to manufacture and easily incorporated in the chain structure.

Another object of the invention is to provide a contact body that will offer a maximum of resistance to bending, breakage, loosening and dislocation.

Another object is to provide an additional contact body having the characteristic conformation of a bifurcated rivet of such proportions and incorporated in the chain structure in such manner as to offer a maximum of resistance to bending, breaking, loosening and dislocation.

In actual practice, the tread of anti-skid devices is usually of such proportions that a length comprising from four to seven links usually suffices for a single tread member. The number of links, however, is not invariable and depends upon the cross-section diameter of the tire and the dimensions of the particular chain used. However, under the usual circumstances only a few (perhaps two or three) of the links of a particular tread member regularly come in contact with the road surface, and, therefore, in drawings accompanying this application, the sections of tread are shown with two only of the links provided with additional contact members. This, however, is merely adapted from conventional methods, and it is to be understood that the number of links of a particular length of tread that may be provided with additional contact bodies is in no wise a part of this invention and may be varied to suit the particular needs of the user.

Referring to the drawings:—

Figure 1 is a side view of a length of tread, two of the links of which are shown provided with contact bodies, one of the links being broken away the better to show the construction of the contact body.

Figure 2 is a plan view of the tread shown in Figure 1.

Figure 3 is a bottom view of the length of tread shown in Figure 1.

Figure 4 is a cross-section view on the line 4, 4 of Figure 3.

Figure 5 is a view showing the configuration of the contact bodies after they have suffered an appreciable amount of wear.

Figure 6 is a bottom view of a section of tread showing a modified embodiment of the invention.

Figure 7 is a bottom view of another modification of the invention.

Figure 8 is a bottom view of still another modification of the invention, and Figure 9 is a view on the section line 9—9 shown on Fig. 8.

In each of the Figures 1, 2 and 3, there is shown a length of chain of the character above referred to as curb chain, made up of the links 1. The contact body includes the stud 2 extending in such direction that when the tread member is in contact with the road surface the edge 3 will, under the force of the traction, encounter minor irregularities of the surface and, under the force of traction, penetrate to a greater or less extent the surface itself.

In view of the fact that it is usually desirable that tread members of the character shown in the drawings shall be interchangeable as to end connections and shall be capable of supporting traction both forwardly and rearwardly, it is preferable that the contact body should exhibit two of these studs extending in opposite directions. I therefore prefer to provide the contact body with an additional stud in addition to that already mentioned, which is indicated by the numeral "4". The two studs, if two are used, may proceed from a common head 5, which likewise serves to secure the structure as a whole firmly to the chain link.

The preferred way of making the contact body consists as shown in Figures 1, 2, 3, 4, and 5, of making the diameter of the studs as great as possible, this diameter being limited by the internal width of the chain link. This can be done by locating both studs in line with the major diameter of the chain link. This arrangement has the further advantage that each stud lies in an uncurved portion 6 of the link and thus each member of the tread exhibits four separate contact surfaces which may if desired be substantially flush with each other. Each member of the tread is therefore capable of being subjected to approximately twice the wear of the conventional chain link, assuming that the stock of the chain and studs is of the same quality and that the contact areas are the same, which in point of fact is approximately the case in the particular embodiments of the inventions which I have found most desirable. These relative quantities, however, are susceptible of variation, according to the desires of the manufacturer or user. The fact which I wish to be noted, however, is that the number of contact surfaces is multiplied, which results in an increased life for the structure as a whole and also by virtue of the character of the additional contact surfaces, in increased traction.

In Figure 7 the contact body 10 is formed of a U-shaped piece of stock with the legs 11 of the U turned in opposite directions so that the U portion of the contact body may lie in the major axis of the link and one of the legs of the U project in a direction parallel to the minor axis of the link on each side of the link. This form is preferably welded to the link.

In Figures 8 and 9, the modified form of contact body 12 comprises a U-shaped section of stock, the legs 13 of the U being turned outwardly with respect thereto so that each leg lies in one of the uncurved portions of the link and the plane of these lies transversely of the link. In this form, the diameter of the stock is necessarily relatively smaller than the diameter of the stock of any of the other forms. This form of contact body is likewise preferably welded to the link, as shown at 14. In fact, the forms shown in Figures 1, 2, 3, 4, 5 and 6 may be welded to the link for further security if desired.

A desirable feature of the invention as embodied in the forms shown in Figs. 7 to 9 is the provision of a chain link having spaced metal strands reinforced by road-contacting means comprising salient metal portions, such as those designated 11 in Fig. 7, and those designated 13 in Figs. 8 and 9, which are respectively secured metallically to the faces of the strands on each side of the major axis of the link, these salient portions being separated by an intervening space between the strands so as to constitute each such portion an individual road-engaging calk for the strand to which it is secured, these calk-portions each presenting a sharply defined traction edge, extending a short distance beyond the outer side of each supporting strand and adapted to bite into the road surface to promote traction and prevent skidding.

The angle of the two intersecting surfaces which define the edges of the additional contact bodies is a matter of choice but in the preferred form this angle has been found most efficient at approximately 90 degrees, or perhaps a little less.

The construction is such that as wear takes place the studs assume the configuration shown at 15 in Figure 5, the edge persisting and functioning throughout.

As is obvious there is a tendency on the part of a tread member to roll between the tire and the road under the force exerted by the traction. In point of fact only a small portion of a complete rotation takes place under ordinary circumstances, but nevertheless this partial rotation further assists in causing the edges of the studs to engage small irregularities of the surface and penetrate smooth surfaces. On account of this partial rotation, it is sometimes found desirable that the edges initially be defined by an angle of less than 90°, so that, as wear takes place, the edges will remain at an angle of no greater than 90° approximately. This is for the reason, as is obvious, that the efficiency of the edges becomes reduced as the angle defining them increases, and this inefficiency becomes more marked as the angle exceeds 90°.

Further changes and modifications in the embodiment of my invention may be made, all of which are intended to be covered by the appended claims.

Having thus described my invention, I claim:—

1. In tread structure for anti-skid devices for vehicle wheels, a chain link, and a separately formed bifurcated contact body therefor, the legs of which pass through said chain link and project in opposite directions with respect to each other, said legs presenting edged parts for contact with the road in the direction in which the force of traction is exerted.

2. In tread structure for anti-skid devices for vehicle wheels, a chain link, and a separately formed bifurcated contact body therefor, the legs of which pass through said chain link, each of said legs partially encircling one of the side strands of said link, so that said legs project in substantially opposite directions with respect to each other, said legs presenting edged parts for contact with the road in the direction in which the force of traction is exerted.

3. In tread structure for anti-skid devices for vehicle wheels, a chain structure composed of twisted open links having salient road-engaging portions and in which are inserted bifurcated U-shaped contact bodies, the legs of which project through said links and respectively partially encircle a side strand of the link and present edged contact portions in opposite directions with respect to each other and form additional contact areas, said bifurcated contact bodies being formed separately from the links.

4. In tread structure for anti-skid devices for vehicle wheels, a chain structure composed of twisted open links and additional contact areas for some of said links, said contact areas being supplied by bifurcated contact bodies, the legs of which project through said link and are turned partially about the side strands thereof, so that they extend in opposite directions with respect to each other, said bodies having substantially flat retaining heads adapted to rest against the tire.

5. In tread structure for anti-skid devices for vehicle wheels, a chain structure composed of twisted open links and additional contact areas for some of said links, said contact areas being supplied by bifurcated contact bodies, the legs of which project through said link and are turned partially about the side strands thereof, so that they extend in opposite directions with respect to each other to present edged portions to the road surface in the direction in which the force of traction is exerted.

6. In tread structure for anti-skid devices for vehicle wheels, a chain link, a bifurcated contact body for said chain link, including a stud having an end portion with a flat face provided with an edge extending in a direction to afford traction on the road surface, said stud comprising a section of round stock extending through said link and partially encircling each side strand thereof, the diameter of said stock being substantially equal to the interior transverse diameter of the link.

7. In tread structure for anti-skid devices for vehicle wheels, a chain link having a central opening, a contact body for said link including two studs provided with edges extending in opposite directions transversely of the link to afford traction on the road surface in two directions, said studs comprising lengths of stock extending through said link at points along the major diameter of the link partially encircling the side strands thereof, one on either side, said stock being of sufficient thickness to occupy the greater part of said central opening across at least one transverse diameter of the link, and means co-operating with said strand engaging portions of the studs for securing said studs in said link.

8. In tread structure for anti-skid devices for vehicle wheels, a chain link having a central opening, a contact body for said link including two studs extending in opposite directions transversely of the link provided with edges to afford traction on the road surface in two directions, said studs comprising lengths of stock extending through said link and partially encircling the side strands thereof, one on either side, at points along the major diameter of the link, said stock being of sufficient thickness to occupy the greater part of said central opening across at least one transverse diameter of the link, and a head portion connecting said studs and extending over the strands at the other side from the road engaging portions of said studs, to co-operate therewith as means for securing said studs in said link.

9. In tread structure for anti-skid devices for vehicle wheels, a chain link having spaced metal strands reinforced by road-contacting means comprising salient metal portions respectively secured metallically to the faces of the strands on each side of the major axis of the link, said salient portions being separated by an intervening space between the strands so as to constitute each such portion an individual road-engaging calk for the strand to which it is secured, and said calk-portions each presenting a sharply defined traction edge extending a short distance beyond the outer side of said supporting strand and adapted to bite into the road surface to promote traction and prevent skidding.

In testimony whereof, I have signed this specification.

JOHN R. REYBURN.